No. 779,723. PATENTED JAN. 10, 1905.
H. P. MACDONALD, Jr.
BOOK STACK.
APPLICATION FILED JAN. 29, 1904.
2 SHEETS—SHEET 1.
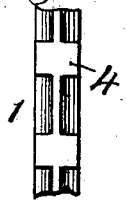
Fig. 1.
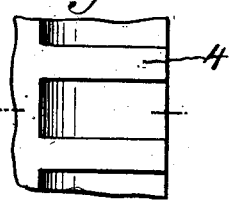
Fig. 2. Fig. 3.
Fig. 4. Fig. 5. Fig. 6.
Fig. 7. Fig. 8. Fig. 9.
Fig. 10. Fig. 11.
Fig. 12. Fig. 13. Fig. 14.
Fig. 15.
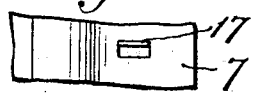
Fig. 16.
Fig. 17.
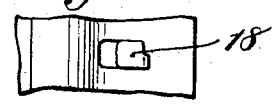
Fig. 18.
Fig. 19.
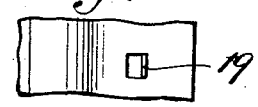
Fig. 20.
Fig. 21.
Fig. 22.
Fig. 23.
Fig. 24.
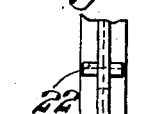
Fig. 25.
Fig. 26.
Fig. 27.
Fig. 28. Fig. 29.
Fig. 30.
Fig. 31.
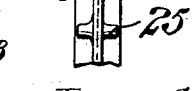
Fig. 32.
Fig. 33.
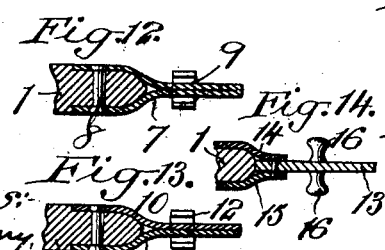
Witnesses:
F. George Gary
Henry Theme
Inventor: Harry P. Macdonald Jr.
by attorneys

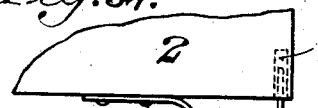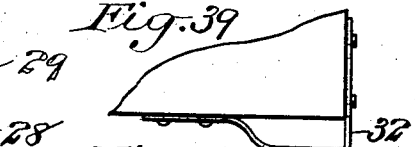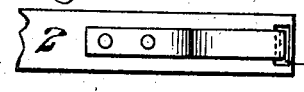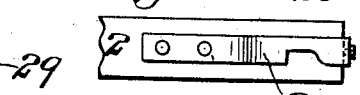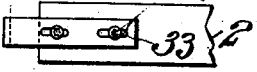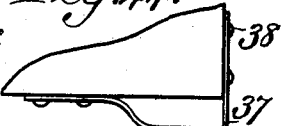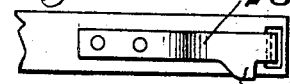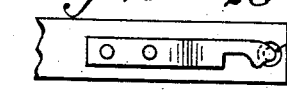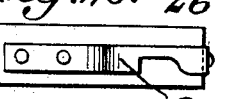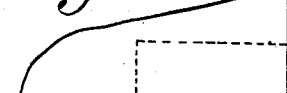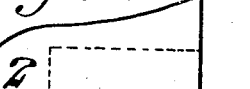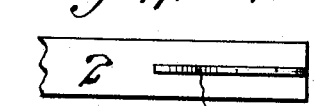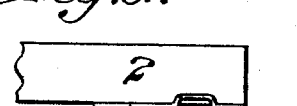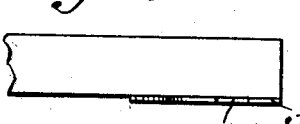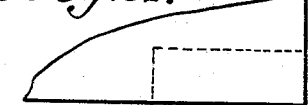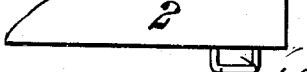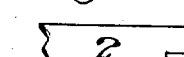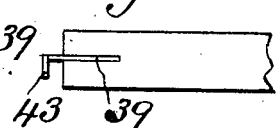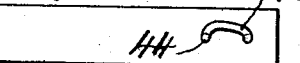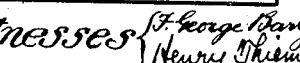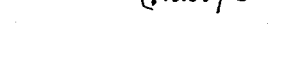

No. 779,723.	Patented January 10, 1905.

UNITED STATES PATENT OFFICE.

HARRY P. MACDONALD, JR., OF JERSEY CITY, NEW JERSEY, ASSIGNOR TO BERNARD R. GREEN, OF WASHINGTON, DISTRICT OF COLUMBIA.

BOOK-STACK.

SPECIFICATION forming part of Letters Patent No. 779,723, dated January 10, 1905.

Application filed January 29, 1904. Serial No. 191,091.

*To all whom it may concern:*

Be it known that I, HARRY P. MACDONALD, Jr., a citizen of the United States, and a resident of Jersey City, in the county of Hudson and State of New Jersey, have invented a new and useful Book-Stack, of which the following is a specification.

My invention relates to book-stacks, and more particularly to stacks in which several vertical series of shelves are separated and supported wholly or in part by upright partitions.

My invention consists, broadly, in providing partitions having their front portions reduced in thickness, the reduced portions being located in planes intermediate of the planes of the opposite sides of the bodies of the partitions, the shelves having supporting-pieces at their adjacent ends arranged to extend toward the opposite sides of the reduced portions and the partitions being provided on the opposite sides of the said reduced portions with ledges for engaging the said supporting-pieces on the shelves to sustain the fronts of the shelves. This structure economizes book-space and renders the shelves readily removable or interchangeable, or both.

A practical embodiment of my invention is represented in the accompanying drawings, which represent several forms which the reduced portion on the partition and the projections on the shelves may assume.

Figures 1, 2, 3 represent front, side, and horizontal sectional views of a portion of a partition, showing plain ledges for supporting the shelves. Figs. 4, 5, 6 represent front, side, and horizontal sectional views of a portion of a partition, showing the ledges provided with notches arranged to interlock with supporting-pieces carried by the shelves. Figs. 7, 8, 9 represent front, side, and horizontal sectional views of a portion of a partition in which the ledges are provided with projections arranged to interlock with recesses in the supporting-pieces carried by the shelves. Figs. 10, 11, 12 represent front, side, and horizontal sectional views of a portion of a partition of modified construction. Fig. 13 represents a horizontal sectional view of a portion of a partition of slightly-different form from that shown in Fig. 12. Fig. 14 represents a horizontal sectional view of a portion of a partition, showing another slightly-modified form. Figs. 15, 16 represent front and side views of a portion of a partition, showing one form of ledge formed therefrom. Figs. 17, 18 are similar views showing another form of ledge. Figs. 19, 20 are similar views showing a third form of ledge. Figs. 21, 22 are similar views showing a fourth form of ledge. Figs. 23, 24 are similar views showing a fifth form of ledge. Figs. 25, 26 are similar views showing a sixth form of ledge. Figs. 27, 28, 29 represent front, side, and horizontal sectional views of a portion of a partition, showing a seventh form of ledge. Figs. 30, 31 represent front and side views of a portion of a partition, showing an eighth form of ledge. Figs. 32, 33 are similar views showing a ninth form of ledge. Figs. 34, 35 represent in top plan and end elevation a portion of a shelf, showing one form of spring supporting-piece for engaging a ledge on the partition. Figs. 36, 37 are similar views showing a spring supporting-piece having a lug thereon for interlocking with a notch in one of the ledges on the partition. Fig. 38 is an end view showing a spring supporting-piece having a recess therein arranged to engage a lug on one of the ledges of the partition. Figs. 39, 40, 41 represent in top plan, end, and front elevation a portion of a shelf, showing a modified form of spring supporting-piece. Figs. 42, 43 represent in top plan and end elevation a portion of a shelf, showing a third form of spring supporting-piece. Figs. 44, 45 are similar views of a fixed supporting-piece. Figs. 46, 47 are similar views of a second form of fixed supporting-piece. Figs. 48, 49 are similar views of a third form of fixed supporting-piece. Figs. 50, 51 are similar views of a fourth form of fixed supporting-piece. Figs. 52, 53, 54 represent in top plan, end, and front elevation a fifth form of fixed supporting-piece. Figs. 55, 56 represent in top plan and end elevation a portion of a shelf with a sixth form of fixed supporting-piece. Fig. 57 represents in end elevation a portion of a shelf with a seventh form of fixed supporting-piece. Figs. 58, 59 represent in top plan and end elevation a portion of a shelf with an eighth form of fixed supporting-piece, and Fig. 60 represents in end elevation a portion of a shelf with a ninth form of fixed supporting-piece.

The partition is denoted by 1, which partition is reduced in width or recessed along its front portion, and such reduced or recessed front portion is provided with ledges for the engagement of supporting-pieces on the shelves 2.

In the form shown in Figs. 1 to 9, inclusive, the metal of the partition itself is reduced in width or recessed along the front of the partition, as shown at 3. At intervals along the opposite faces of the reduced portion of the partition ledges 4 are formed extending outwardly flush with the opposite faces of the partition, the said ledges being formed by the reduction in width of the front of the partition. In Figs. 1, 2, and 3 these ledges are left plain for receiving thereon the supporting-pieces of the shelves to be hereinafter described. This form does not lock the shelf against forward displacement.

In the form shown in Figs. 4, 5, and 6 the ledges 4 are provided on their top faces with notches 5 for the reception of projections on the shelves to lock the shelves against forward displacement.

In Figs. 7, 8, and 9 the top faces of the ledges 4 are provided with projections 6, fitted to enter recesses in the supporting-pieces on the shelves to hold the shelves against forward displacement.

In the form shown in Figs. 10, 11, and 12 the reduced front of the partition 1 is formed by a single sheet of metal 7 bent back upon itself and having its edges countersunk into the partition 1 and secured by suitable rivets 8 or other fastening devices. In this form ledges 9 are struck from the sheet 7.

Fig. 13 represents a form in which the reduced front of the partition 1 is formed by two sheets of metal 10 and 11, riveted or otherwise secured to the partition and bent into proximity to each other. Each of these sheets 10 and 11 has a ledge 12 struck therefrom.

In Fig. 14 a narrow strip 13 of metal is shown as secured to the front of the partition 1 by two sheets of metal 14 15. This strip 13 is provided with ledges 16, which may be secured thereon or formed integral therewith, as may be found desirable.

In Figs. 15 and 16 the reduced portion of the partition is shown as formed of a single sheet of metal 7, as indicated in Fig. 12, a modified form of ledges 17 being shown struck from the metal.

Similarly, in Figs. 17, 18, 19, 20, 21, 22, 23, 24, 25, 26, 27, 28, and 29 ledges 18, 19, 20, 21, 22, and 23, respectively, of different forms are represented as struck from the reduced portion of the partition. These ledges are of different forms to form supports for or interlock with supporting-pieces on the shelves.

In Figs. 30, 31 the ledges are represented as being headed pins 24, and in Figs. 32, 33 the ledges are represented as being plain cylindrical pins 25.

The supporting-pieces on the shelves for resting upon or interlocking with the ledges on the reduced portion of the partition may be of various forms, as follows: In the form shown in Figs. 34 to 42, inclusive, the supporting-piece at the end of the shelf 2 is spring-actuated, so as to press snugly against the face of the reduced portion of the partition to take up lost motion and prevent the shelf from rattling. In Figs. 34 to 38, inclusive, this supporting-piece comprises a strip of spring metal 26, secured at 27 to the end of the shelf and provided with a portion spaced from the shelf, and a laterally-extended portion 28, which is fitted to enter an opening 29 in the end of the shelf.

In Fig. 37 the portion of the spring supporting-piece which is spaced from the end of the shelf is provided with a projection 30, fitted to interlock with a notch in one of the ledges of the partition—as, for instance, the notch 5.

In Fig. 38 the spring supporting-piece is provided with a recess 31, fitted to interlock with a projection on one of the ledges on the partition—as, for instance, the projection 6.

In Figs. 39, 40, and 41 the laterally-extended arm 32 of the spring supporting-piece 26 is fitted to slide along the front of the shelf 2 by means of pin-and-slot connections 33 34.

In Figs. 42, 43 the laterally-extended arm 35 of the spring supporting-piece 26 is shown of rounded form instead of flat, which arm enters a cylindrical opening 36 in the end of the shelf 2.

In Figs. 44 and 45 the laterally-extended arm 37 of the supporting-piece 26 is shown as fixed to the front of the shelf 2, as by rivets 38. The supporting-pieces 26 may be provided with recesses or projections or may be made plain, as desired, to suit different requirements.

In Figs. 46 and 47 the supporting-piece 39 is shown permanently secured to the end of the shelf 2 and provided with a recess 40 for engaging a projection on one of the ledges of the partition, which recess is shown as an elongated slot cut in the supporting-piece. In Figs. 48 and 49 this supporting-piece 39 is shown as being provided with a recess 41 cut in the edge of the piece.

In Figs. 50 and 51 the supporting-piece 39 is shown as being provided with a recess 42 by pressing the metal which forms the piece upwardly, as shown.

In Figs. 52, 53, and 54 the supporting-piece 39 is shown as being provided with a projection 43, formed by turning down a tongue along the outer edge of the piece.

In Figs. 55 and 56 the supporting-piece is denoted by 44 and is shown as of staple form, thereby forming a recess 45.

In Fig. 57 the staple-like supporting-piece 44 has its outer portion bent upwardly, as shown at 46, to form another-shaped recess.

In Figs. 58 and 59 the supporting-piece is formed by two pins 47, projecting from the end of the shelf.

In Fig. 60 the supporting-piece is shown as formed by a single pin 48, projecting from the end of the shelf.

It will be seen from the above description that this invention contemplates the supporting of the fronts of the book-shelves by providing the partitions with reduced or recessed front portions and providing the shelves with means for engaging the partitions within such reduced or recessed front portions. It will also be seen that this result may be accomplished in various ways, means being provided for supporting the shelves and preventing endwise movement thereon only or means being provided for interlocking the shelves and partitions so as to prevent a forward movement of the shelves as well.

What I claim is—

1. In a book-stack, the combination with an upright partition having its front portion reduced in thickness, the said reduced portion being located in a plane intermediate of the planes of the opposite sides of the body of the partition, of shelves provided with supporting-pieces at their adjacent ends arranged to extend toward the opposite sides of the said reduced portion of the partition within the planes of the opposite sides of the body of said partition, the said partition being provided on the opposite sides of its reduced portion with ledges for engaging the supporting-pieces on the shelves to sustain the fronts of the shelves.

2. In a book-stack, the combination with an upright partition having its front portion reduced in thickness, the said reduced portion being located in a plane intermediate of the planes of the opposite sides of the body of the partition, of shelves provided with supporting-pieces at their adjacent ends arranged to extend toward the opposite sides of the said reduced portion of the partition within the planes of the opposite sides of the body of said partition, the said partition being provided on the opposite sides of its reduced portion with ledges arranged to interlock with the supporting-pieces on the shelves to support the shelves and hold them against forward and backward displacement.

In testimony that I claim the foregoing as my invention I have signed my name, in presence of two witnesses, this 22d day of January, 1904.

HARRY P. MACDONALD, JR.

Witnesses:
 FREDK. HAYNES,
 HENRY THIEME.